United States Patent [19]

Makishima

[11] 4,450,734
[45] May 29, 1984

[54] TRANSMISSION APPARATUS FOR A FOUR-WHEEL DRIVE MOTOR VEHICLE

[75] Inventor: Sadao Makishima, Akigawa, Japan

[73] Assignee: Fuji Jukogyo Kabushiki Kaisha, Tokyo, Japan

[21] Appl. No.: 308,707

[22] Filed: Oct. 5, 1981

[30] Foreign Application Priority Data

Oct. 9, 1980 [JP] Japan ................................ 55-142259

[51] Int. Cl.³ .................... F16H 37/06; F16H 37/08
[52] U.S. Cl. .................................. 74/665 F; 74/700; 180/247
[58] Field of Search .................. 74/15.6, 15.66, 15.8, 74/15.82, 15.63, 700, 701, 745, 665 F, 665 G, 665 GA, 665 GC; 180/247, 297

[56] References Cited

U.S. PATENT DOCUMENTS

| | | | |
|---|---|---|---|
| 2,140,687 | 12/1938 | Brown | 74/15.6 |
| 3,027,960 | 4/1962 | Ditel | 180/247 |
| 3,580,350 | 5/1971 | Duntov | 180/297 |
| 3,613,816 | 10/1971 | Gutbrod | 74/15.63 |
| 4,292,860 | 10/1981 | Kako et al. | 180/247 |
| 4,367,661 | 1/1983 | Moroto | 74/665 G |

FOREIGN PATENT DOCUMENTS 747762 10/1944 Fed. Rep. of Germany ...... 180/247

Primary Examiner—Lawrence J. Staab
Assistant Examiner—Bruce Wojciechowski
Attorney, Agent, or Firm—Martin A. Farber

[57] ABSTRACT

A transmission apparatus for a motor vehicle having an internal combustion engine transversely disposed in the vehicle at an end portion thereof, a transmission transversely disposed and connected to the crankshaft of the engine at one end portion of the transmission, a final reduction gear engaged with an output gear of the transmission, the output gear being mounted on an output shaft of the transmission adjacent an end of the engine, a differential secured to a side of the final reduction gear, and an axle connected to the differential for one pair of the vehicle wheels. A transfer device is connected to another portion of the output shaft of the transmission. The transfer device comprises a transfer shaft, a gear train provided at the other end portion of the transmission, and a clutch device for engaging the gear train with the output shaft of the transmission. A propeller shaft is connected to the transfer device for driving other axles of the vehicle for the other pair of vehicle wheels for four-wheel drive.

14 Claims, 1 Drawing Figure

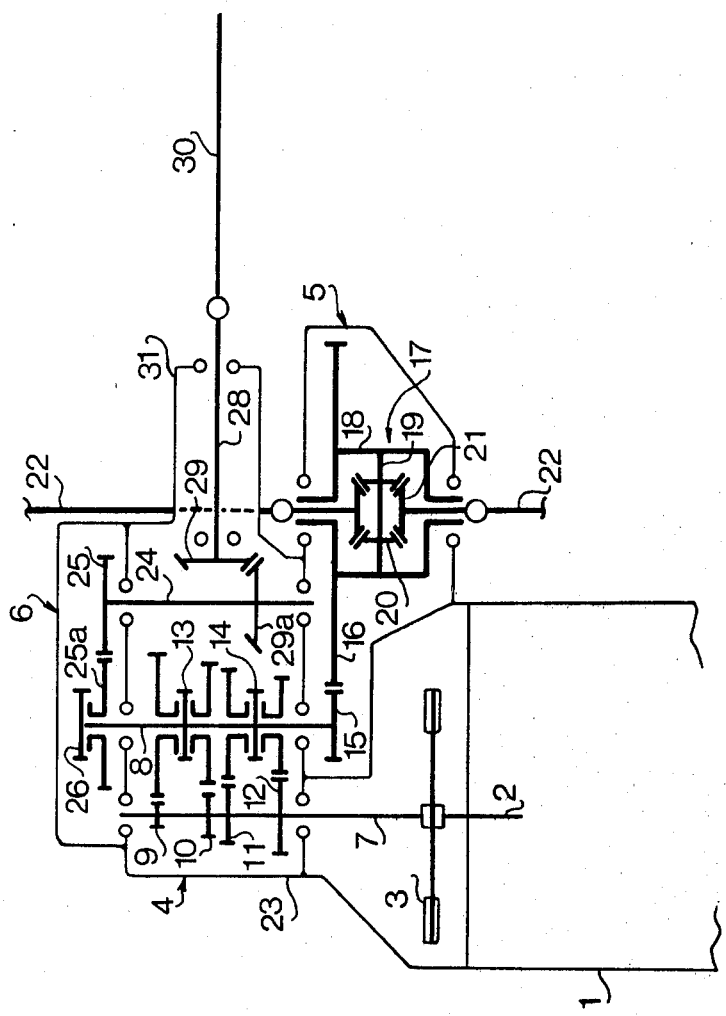

TRANSMISSION APPARATUS FOR A FOUR-WHEEL DRIVE MOTOR VEHICLE

BACKGROUND OF THE INVENTION

The present invention relates to a transmission apparatus for a four-wheel drive motor vehicle or for conversion to a two-wheel drive vehicle to a four-wheel drive vehicle in general. Particularly it relates to this in a vehicle in which the engine is transversely disposed in the front or rear part of the vehicle and the output of the engine is selectively transmitted to the front and rear wheel axles of the vehicle through the transmission. In such a transverse arrangement of the engine, the transmission and the clutch, the longitudinal distance of the power in the vehicle can be remarkably shortened. A four-wheel drive vehicle based on such an arrangement has already been basically provided.

In a four-wheel drive arrangement, engine power is also transmitted from the final reduction device through a transfer device to the wheels other than the main driving wheels. Such an arrangement has the advantage in that the four-wheel drive may be established without any alteration of the disposition in the transmission system. However, because the transfer device which is connected to the final reduction device has to be provided with a clutch device for changing from the two-wheel drive condition to the four-wheel drive condition as well as with shafts and gears for the clutch device, the system occupies a large space using some of the car room. Also it is necessary to provide a gear train to compensate for the speed reduction caused by the final reduction device, which is subject to a large load for four-wheel driving.

SUMMARY OF THE INVENTION

Accordingly, it is an object of the present invention to provide an apparatus in which power for driving the front wheels and the rear wheels is transmitted from different portions in the apparatus, so that only a part of the apparatus is not subject to a load.

According to the present invention, there is provided a transmission apparatus for a motor vehicle having an internal combustion engine transversely disposed in the vehicle at an end portion thereof, comprising a transmission transversely disposed and connected to the crankshaft of the engine at one end portion of said transmission, an output gear mounted on an output shaft of the transmission at a position thereof adjacent to an end of the engine, a final reduction gear engaged with the output gear of the transmission, a differential secured to a side of the final reduction gear, an axle connected to the differential, a transfer device provided at another end portion of the transmission, the transfer device comprising a gear train provided at the end portion of the transmission opposite to the end having the output gear and a clutch device for engaging the gear train with an output shaft of the transmission, and a propeller shaft connected to the transfer device for driving other axles for the four-wheel drive.

Other objects and features of the present invention will be fully described with reference to the accompanying drawings.

BRIEF DESCRIPTION OF THE DRAWINGS

The only FIGURE is a schematic view showing an embodiment of the present invention.

DETAILED DESCRIPTION OF THE PREFERRED EMBODIMENT

In the FIGURE, an engine 1 is transversely disposed in a front part of a vehicle. A transmission 4 at one end thereof by its input shaft 7 is disposed in alignment and selective connection with an engine crankshaft 2 through a clutch 3. Thus, the engine 1, the clutch 3 and the transmission 4 are disposed in a transverse arrangement. Near the engine, a final reduction device 5 is positioned transmittingly connected with the end portion of the transmission 4 in common with the end of the transmission 4 which is connected to the crankshaft 2 of the engine 1. At the other end of the transmission 4, a transfer device 6 is disposed in releasable transmitting connection thereto through a transfer shaft 24 which is parallel to an output shaft 8 of the transmission.

The transmission is of a synchronized engaging type and, for example, of 4 speeds. The transmission comprises transmission gear trains 9, 10, 11 and 12 rotatably mounted on the transmission shafts 7 and 8 for providing 1st to 4th gears. When one of gears on the shaft 8 is selectively jointly rotatably connected with the shaft 8 by operating a synchromesh mechanism 13 or 14, the power transmitted by one of 1st to 4th gears is produced on the output shaft 8.

The final reduction device 5 comprises an output gear 15 which is jointly rotatably connected with the output shaft 8 at the engine side end thereof, and a final reduction gear 16 which is jointly connected with a case 18 of a differential 17 on the engine side thereof. The differential 17 comprises a pair of pinions 20 mounted on a spider 19 and a pair of side gears 21 engaged with the pinions 20. A pair of axles 22 of front wheels of the vehicle extend from the side gears 21 for driving the front wheels.

In a transmission case 23 of the transmission 4 constituting the transfer device 6, the transfer shaft 24 is provided parallel to the output shaft 8. A transfer gear 25a is rotatably mounted on an end portion of the output shaft 8, which is opposite to the end where the final reduction device 5 is located. A clutch device 26 such as a friction clutch is provided on the end of the output shaft 8 for engaging the transfer gear 25a with the shaft 8.

A transfer gear 25 engages with the transfer gear 25a, the transfer gear 25 being jointly rotatably connected with the transfer shaft 24. A bevel gear 29a is also jointly rotatably connected with the transfer shaft 24. A rear drive shaft 28 is rotatably connected to the transfer shaft 24 by a bevel gear 29 which is jointly rotatably connected with the shaft 28 and engages with the bevel gear 29a. The rear drive shaft is disposed extending through an extension housing 31 which is provided behind the transmission case 23 and is connected to the rear wheels of the vehicle through a propeller shaft 30.

In accordance with the apparatus of the present invention output power from the engine is transmitted to the main shaft 7 of the transmission 4 through the clutch 3 which is in engagement with the crankshaft 2, and further to the output shaft 8 through one of gear trains 9 to 12.

In the condition with the clutch device 26 disengaged, the power on the output shaft 8 of the transmission 4 is transmitted only to the front wheels through the final reduction device 5, the differential 17, and the axle 22 to achieve front wheel driving.

On the other hand, when the clutch device 26 is engaged with the output shaft 8, the output shaft 8 is connected to the transfer shaft 24 through transfer gears 25a and 25. Thus, the power is also transmitted from the output shaft 8 to the transfer shaft 24 through the clutch device 26, gears 25a and 25, and further to the rear wheels through the rear drive shaft 28, the propeller shaft 30, and a rear differential (not shown). Therefore, the power of the engine is transmitted to both the front and rear wheels to establish four-wheel driving.

Although, in the above described embodiment, the engine 1 is mounted in a front part of vehicle to drive the front wheels through the final reduction device 5 and to transmit power to the rear wheels through the propeller shaft 30, it is, to the contrary, possible to mount the engine in a rear part of the vehicle to drive the rear wheels through the final reduction device 5 and to transmit the power to the front wheels through the propeller shaft 30.

Thus, in accordance with the present invention, an engine and a transmission connected to the engine are transversely mounted on the vehicle, and the transmission has at one end portion thereof a final reduction device and at the other end portion thereof a transfer device, so that the conversion of a conventional car to four-wheel driving car may be easily done by providing a transfer device 6 having a clutch device 26 without any changes in the transmission 4 and the final reduction device 5. Further, because the power is transmitted to all four wheels from separate portions of the transmission, the load for the four-wheel driving is not concentrated on only one part. Thus, a uniform distribution of the load may be effected in the transmission.

What is claimed is:

1. A transmission apparatus, for a motor vehicle defining a longitudinal direction and having an internal combustion engine with a crankshaft transversely disposed in said vehicle adjacent an end portion of the latter, comprising
    a transmission transversely disposed in said vehicle and operatively connected to the crankshaft of said engine at one end portion of said transmission,
    said transmission having an output shaft and an output gear mounted on said output shaft at a position thereof adjacent to an end of said engine,
    a final reduction gear engages with said output gear of said transmission,
    a differential is secured to a side of said final reduction gear,
    axles, adapted for a pair of wheels of the vehicle, are connected to the differential,
    a transfer device provided at another end portion of said transmission, said transfer device comprising, a gear train provided at said another end portion of said transmission, and a clutch means for operatively engaging said gear train with said output shaft of said transmission, and
    a propeller shaft means operatively connected to said gear train of said transfer device for driving other axles adapted for another pair of wheels of the vehicle and four-wheel drive.

2. The transmission apparatus for a motor vehicle according to claim 1 wherein
    said transfer device further comprises,
    a transfer shaft disposed parallel to said output shaft of said transmission,
    said gear train includes one gear mounted on said transfer shaft and another gear mounted on said output shaft, and bevel gears operatively connecting said propeller shaft means to said transfer shaft.

3. The transmission apparatus for a motor vehicle according to claim 2, wherein
    said one gear is jointly rotatably mounted on one of said shafts, and said another gear is freely rotatably mounted on the other of said shafts and engages said one gear, and
    said clutch means is for jointly rotatably engaging said another gear with said other shaft.

4. The transmission apparatus for a motor vehicle according to claim 3, wherein
    said one shaft is said transfer shaft and said other shaft is said output shaft.

5. The transmission apparatus for a motor vehicle according to claim 1, further comprising
    a rear drive shaft extending substantially parallel to the longitudinal direction of the vehicle, said rear drive shaft connects said propeller shaft means to said gear train.

6. The transmission apparatus for a motor vehicle according to claim 5, wherein
    said gear train includes a meshing bevel gear pair having one bevel gear jointly rotatably connected with said rear drive shaft.

7. The transmission apparatus for a motor vehicle according to claim 6, wherein
    said transfer device further comprises,
    a transfer shaft disposed parallel to said output shaft of said transmission and operatively connected thereto by said gear train and said clutch means, and
    said bevel gear pair includes another bevel gear jointly rotatably connected to said transfer shaft, and said bevel gears mesh with each other.

8. The transmission apparatus for a motor vehicle according to claim 7, wherein
    said another bevel gear is jointly rotatably connected to said transfer shaft adjacent said output gear of said transmission.

9. The transmission apparatus for a motor vehicle according to claim 2, further comprising
    a rear drive shaft extending substantially parallel to the longitudinal direction of the vehicle, said rear drive shaft is connected to said propeller shaft means and to one of said bevel gears, another of said bevel gears is connected to said transfer shaft and engages with said one bevel gear,
    said rear drive shaft is substantially perpendicular to said transfer shaft.

10. The transmission apparatus for a motor vehicle according to claim 1 wherein
    one of the gears of said gear train operatively cooperates with said clutch means,
    said one gear is mounted adjacent an end of said output shaft constituting said another end portion of said transmission.

11. The transmission apparatus for a motor vehicle according to claim 1, wherein
    said transmission includes an input shaft in parallel to said output shaft and operatively connected to said crankshaft at said one end portion of said transmission, and a plurality of transmission gear trains operatively connected to said input and output shafts between said end portions of said transmission so as to provide a plurality of gear ratios, respectively, at said output shaft.

12. The transmission apparatus for a motor vehicle according to claim 1, wherein
said end portions of said transmission are aligned with respect to each other substantially transversely relative to the longitudinal direction of the vehicle.

13. The transmission apparatus for a motor vehicle according to claim 1, wherein
said another end portion is at an end portion of said output shaft.

14. A transmission apparatus, for a motor vehicle defining a longitudinal direction and having an internal combustion engine with a crankshaft transversely disposed in said vehicle adjacent an end portion of the latter, comprising a transmission transversely disposed in said vehicle and operatively connected to the crankshaft of said engine at one end portion of said transmission,
said transmission having an output shaft and an output gear mounted on said output shaft at a first portion thereof adjacent to an end of said engine,
axles, adapted for a pair of wheels of the vehicle, are operatively connected to the output gear,
a transfer device provided on a second portion of said output shaft spaced from said first portion,
a propeller shaft means operatively connected to said transfer device for driving other axles adapted for another pair of wheels of the vehicle and four-wheel drive.

* * * * *